United States Patent
Mardh et al.

(10) Patent No.: US 10,640,145 B2
(45) Date of Patent: May 5, 2020

(54) APPARATUS AND METHOD FOR SITUATION DEPENDENT HAD OR ADAS WHEEL ANGLE CONTROL

(71) Applicant: VOLVO CAR CORPORATION, Gothenburg (SE)

(72) Inventors: Lars Johannesson Mardh, Torslanda (SE); Malin Haglund, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 190 days.

(21) Appl. No.: 15/920,019

(22) Filed: Mar. 13, 2018

(65) Prior Publication Data

US 2018/0265123 A1   Sep. 20, 2018

(30) Foreign Application Priority Data

Mar. 20, 2017   (EP) .................................... 17161795

(51) Int. Cl.
   *B62D 6/00*   (2006.01)
   *G05D 1/02*   (2020.01)
   (Continued)

(52) U.S. Cl.
   CPC .............. *B62D 6/002* (2013.01); *B62D 5/046* (2013.01); *B62D 5/0463* (2013.01); *B62D 6/008* (2013.01);
   (Continued)

(58) Field of Classification Search
   CPC ..................................................... B62D 6/002
   See application file for complete search history.

(56) References Cited

U.S. PATENT DOCUMENTS 5,270,708 A * 12/1993 Kamishima ........ G01C 21/3697
                                                            340/905
5,765,116 A    6/1998 Wilson-Jones et al.
(Continued)

FOREIGN PATENT DOCUMENTS

| EP | 1291227 A2 | 3/2003 |
|---|---|---|
| EP | 2 159 777 A2 | 3/2010 |
| EP | 3 106 367 A1 | 12/2016 |

OTHER PUBLICATIONS

Extended European Search Report dated Sep. 20, 2017, Application No. 17161795.4-1755, Applicant Volvo Car Corporation, 9 Pages.
(Continued)

*Primary Examiner* — Alex C Dunn
(74) *Attorney, Agent, or Firm* — Brooks Kushman P.C.

(57) ABSTRACT

An apparatus and method are described for situation dependent wheel angle ($\delta_w$) control by a HAD or ADA system of a road vehicle, the HAD or ADA system configured to receive internal state data as well as ambient information or map data, and generates a penalty measure based thereupon. A lateral controller receives a desired path and outputs a wheel angle request ($\delta_{w,r}$). A PSCM includes a wheel angle controller configured to receive the wheel angle request ($\delta_{w,r}$), wheel angle ($\delta_w$) and wheel angle rate ($\dot{\delta}_w$) data, and output an overlay torque request to a motor controller of a steering system. The lateral controller calculates gain parameters ($I_{\delta_w}$, $I_{\dot{\delta}_w}$) based on the penalty measure and outputs these to the wheel angle controller. The wheel angle controller receives and uses the gain parameters ($I_{\delta_w}$, $I_{\dot{\delta}_w}$) in control loops thereof to adjust the bandwidth of the wheel angle controller.

12 Claims, 5 Drawing Sheets

(51) Int. Cl.
*B62D 5/04* (2006.01)
*B62D 15/02* (2006.01)
*G08G 1/16* (2006.01)

(52) U.S. Cl.
CPC ......... *B62D 15/025* (2013.01); *G05D 1/0212* (2013.01); *G05D 1/0246* (2013.01); *G05D 1/0274* (2013.01); *G08G 1/167* (2013.01); *G05D 2201/0213* (2013.01)

(56) References Cited

U.S. PATENT DOCUMENTS

| | | | | |
|---|---|---|---|---|
| 5,925,082 | A * | 7/1999 | Shimizu | B62D 6/00 180/272 |
| 6,053,270 | A | 4/2000 | Nishikawa et al. | |
| 6,178,365 | B1 | 1/2001 | Kawagoe et al. | |
| 6,487,501 | B1 | 11/2002 | Jeon | |
| 6,879,896 | B2 | 4/2005 | Martens | |
| 8,118,126 | B2 | 2/2012 | Rattapon et al. | |
| 8,121,760 | B2 | 2/2012 | Ghoneim et al. | |
| 8,392,064 | B2 | 3/2013 | Thrun et al. | |
| 9,002,579 | B2 * | 4/2015 | Kataoka | B62D 15/025 701/41 |
| 9,156,464 | B2 | 10/2015 | Schuberth et al. | |
| 9,428,219 | B2 * | 8/2016 | Flehmig | B62D 6/002 |
| 9,499,202 | B2 | 11/2016 | Lewis et al. | |
| 9,586,619 | B1 * | 3/2017 | Akatsuka | B62D 15/025 |
| 9,731,755 | B1 * | 8/2017 | Moshchuk | B62D 1/28 |
| 10,464,603 | B2 * | 11/2019 | Mardh | B62D 15/025 |
| 2001/0020902 | A1 * | 9/2001 | Tamura | G01C 21/3697 340/905 |
| 2002/0194016 | A1 * | 12/2002 | Moribe | G01C 21/3697 701/469 |
| 2003/0045982 | A1 * | 3/2003 | Kondo | B62D 15/025 701/41 |
| 2004/0030670 | A1 * | 2/2004 | Barton | G08G 1/0104 |
| 2004/0262063 | A1 | 12/2004 | Kaufmann et al. | |
| 2005/0273262 | A1 * | 12/2005 | Kawakami | B62D 15/025 701/301 |
| 2006/0200289 | A1 * | 9/2006 | Chino | B62D 5/003 701/41 |
| 2007/0027583 | A1 * | 2/2007 | Tannin Asaf | G06Q 30/0283 701/1 |
| 2007/0198145 | A1 | 8/2007 | Norris et al. | |
| 2008/0047775 | A1 * | 2/2008 | Yamazaki | B62D 15/025 180/443 |
| 2009/0319060 | A1 * | 12/2009 | Wojsznis | G05B 11/42 700/30 |
| 2010/0152952 | A1 | 6/2010 | Lee et al. | |
| 2011/0055577 | A1 * | 3/2011 | Candelore | H04L 9/32 713/176 |
| 2012/0109465 | A1 | 5/2012 | Svensson et al. | |
| 2012/0109466 | A1 | 5/2012 | Svensson et al. | |
| 2012/0166032 | A1 * | 6/2012 | Lee | B60W 30/12 701/23 |
| 2013/0096778 | A1 * | 4/2013 | Goto | B62D 5/008 701/41 |
| 2015/0012182 | A1 * | 1/2015 | Flehmig | B62D 6/002 701/41 |
| 2015/0183460 | A1 * | 7/2015 | Oyama | B62D 15/025 701/41 |
| 2015/0344029 | A1 * | 12/2015 | Silvlin | B62D 15/025 701/36 |
| 2016/0207537 | A1 | 7/2016 | Urano et al. | |
| 2016/0229447 | A1 * | 8/2016 | Wada | B62D 6/007 |
| 2016/0272197 | A1 * | 9/2016 | Hulten | B60W 30/02 |
| 2016/0362102 | A1 * | 12/2016 | Honda | B62D 6/00 |
| 2016/0375911 | A1 * | 12/2016 | Coelingh | B60W 50/14 701/23 |
| 2017/0088174 | A1 | 3/2017 | Inoue et al. | |
| 2017/0106903 | A1 * | 4/2017 | Moretti | B62D 1/286 |
| 2017/0225686 | A1 * | 8/2017 | Takaso | G08G 1/167 |
| 2017/0232997 | A1 * | 8/2017 | Tsubaki | B62D 5/0409 180/443 |
| 2017/0282972 | A1 * | 10/2017 | Moretti | B62D 15/025 |
| 2017/0291638 | A1 * | 10/2017 | Gupta | B60W 40/103 |
| 2017/0297621 | A1 * | 10/2017 | Bunderson | G05D 1/0217 |
| 2017/0355396 | A1 | 12/2017 | Varunjikar et al. | |
| 2018/0157221 | A1 * | 6/2018 | Anderson | G05B 13/024 |
| 2018/0229769 | A1 | 8/2018 | Mardh et al. | |
| 2018/0265120 | A1 | 9/2018 | Mardh et al. | |
| 2018/0265128 | A1 * | 9/2018 | Mardh | B62D 15/025 |
| 2019/0241189 | A1 | 8/2019 | Odate | |

OTHER PUBLICATIONS

U.S. Patent and Trademark Office, Notice of Allowance for U.S. Appl. No. 15/888,717, dated Sep. 23, 2019.

Mardh, Lars Johannesson, United States Patent and Trademark Office, Non-Final Office Action for U.S. Appl. No. 15/888,879, dated Aug. 28, 2019.

Mardh et al., Amendment Under 37 C.F.R. § 1.111 for U.S. Appl. No. 15/918,139, filed with the U.S. Patent and Trademark Office dated Nov. 22, 2019.

Mardh et al., Supplemental Response for U.S. Appl. No. 15/918,139, filed with the U.S. Patent and Trademark Office dated Nov. 23, 2019.

Mardh, et al., Amendment Under 37 C.F.R. § 1.111 for U.S. Appl. No. 15/888,879, filed with the U.S. Patent and Trademark Office dated Nov. 22, 2019.

European Patent Office, Extended European Search Report for European Application No. 17155512.1-1755, dated Jul. 6, 2017, 5 pages.

European Patent Office, Extended European Search Report for European Application No. 17161563.6-1755, dated Sep. 19, 2017, 5 pages.

European Patent Office, Extended European Search Report for European Application No. 17161786.3-1755, dated Sep. 19, 2017, 9 pages.

U.S. Patent and Trademark Office, Non-Final Office Action for U.S. Appl. No. 15/918,139, dated Jul. 30, 2019, 18 pages.

U.S. Patent and Trademark Office, Notice of Allowance for U.S. Appl. No. 15/918,139, dated Dec. 18, 2019.

U.S. Patent and Trademark Office, Notice of Allowance for U.S. Appl. No. 15/888,879, dated Dec. 18, 2019.

* cited by examiner

APPARATUS AND METHOD FOR SITUATION DEPENDENT HAD OR ADAS WHEEL ANGLE CONTROL

CROSS-REFERENCE TO RELATED APPLICATIONS

This application claims foreign priority benefits under 35 U.S.C. § 119(a)-(d) to European patent application number EP 17161795.4, filed Mar. 20, 2017, which is incorporated by reference in its entirety.

TECHNICAL FIELD

The present application relates to an apparatus for situation dependent wheel angle control by a highly autonomous driving system or an advanced driver assistance system of a road vehicle and a method therefore.

BACKGROUND

It is known to use power steering in road vehicles, e.g., electrical power assisted steering, commonly abbreviated as EPAS, in a road vehicle such as a car, lorry, bus or truck, wherein an electric motor assists a driver of the road vehicle by adding an assistive torque to e.g., a steering column or steering rack of the road vehicle.

It is further known to use advanced driver assistance systems, commonly abbreviated as ADAS, such as Lane Keeping Aid systems, commonly abbreviated as LKA systems, in order to help a road vehicle driver maintain the road vehicle in a desired lane. For LKA or lane centering systems where an EPAS is used, a steering wheel torque overlay, i.e., additional steering wheel torque on top of what would have been obtained by the base assist of the EPAS, is used for lateral position control.

However, the need for more advanced autonomous steering functions and also highly autonomous driving (HAD) has put new requirements on current steering safety concepts. One example of such a more advanced autonomous steering function is commonly called Pilot Assist, commonly abbreviated as PA, which helps a driver to drive the vehicle within the road lane whilst at the same time maintaining a preselected time interval to a preceding vehicle.

Highly autonomous driving and advanced driver assistance systems, such as the above described Pilot Assist, adds a requirement of high bandwidth in the wheel angle controller in order for a HAD or PA path wheel/pinion angle request to be tracked fast and accurately.

However, high bandwidth in the wheel angle controller may result in nervous and active steering wheel motions in situations where this behavior is undesirable, for example when driving on a wide lane or on a straight road. In addition to potentially causing discomfort to vehicle occupants this may also be perceived as control of the vehicle being erratic and nervous.

Thus, there is a need for improved solutions which are able to comfortably, calmly and steadily, handle the above requirement for tracking of a HAD or PA path whilst facilitating fulfillment of high Automotive Safety Integrity requirements.

SUMMARY

Embodiments herein aim to provide an improved apparatus for situation dependent wheel angle control by a highly autonomous drive system or an advanced driver assistance system of a road vehicle the highly autonomous drive system or advanced driver assistance system being arranged to receive internal state data from one or more road vehicle internal state measurement units and at least one of ambient information on the road vehicle surroundings from one or more road vehicle surrounding monitoring cameras and map data relating to the road vehicle surroundings from a road vehicle localization system.

This is provided through an apparatus comprising: a lateral controller arranged to receive from the highly autonomous drive system or advanced driver assistance system information on a desired path, and to output a wheel angle request; a power steering control module comprising a wheel angle controller arranged to receive as inputs the wheel angle request from the lateral controller as well as wheel angle and wheel angle rate data, and to output an overlay torque request suitable for a motor controller of a steering system of the road vehicle, wherein: the highly autonomous drive system or advanced driver assistance system is arranged to generate a penalty measure indicative of how penalties should be handled in the lateral controller based on the internal state data and at least one of the ambient information and the map data, and that the lateral controller further is arranged to calculate gain parameters, based on the penalty measure and to output to the wheel angle controller the calculated gain parameters; and that the wheel angle controller further is arranged to receive and use the gain parameters in control loops of the wheel angle controller, such that the bandwidth of the wheel angle controller is increased if one or more of the ambient information, the map data and the internal state data indicate a need for increased control speed and accuracy for safely tracking the desired path, and reduced if one or more of the ambient information, the map data and the internal state data indicate that decreased control speed and accuracy can be allowed whilst still safely tracking the desired path.

The provision of using gain parameters in control loops of the wheel angle controller, as above, provides for using high bandwidth in a wheel angle controller in order for a desired path to be tracked with increased control speed and accuracy when a traffic situation so requires, such as when free-space for safe maneuvers is limited, and reduced bandwidth in traffic situations allowing less precise control, such as when driving on a wide lane or on a straight road with ample space for safe maneuvering.

According to a second embodiment it is provided that the lateral controller further is arranged to calculate the gain parameters to provide for increased control speed and accuracy in tracking of the desired path if at least one of the ambient information, the map data and the internal state data indicate a reduced margin for safe road vehicle travel along the desired path.

The provision of increased control speed and accuracy in tracking of the desired path if at least one of the ambient information, the map data and the internal state data indicate a reduced margin for safe road vehicle travel provides for a desired path to be tracked with high control speed and accuracy when a traffic situation so requires, such as when free-space for safe maneuvers is limited.

According to a third embodiment it is provided that the lateral controller further is arranged to calculate the gain parameters to provide for decreased control speed and accuracy in tracking of the desired path if at least one of the ambient information, the map data and the internal state data indicate an increased margin for safe road vehicle travel along the desired path.

The provision of decreased control speed and accuracy in tracking of the desired path if at least one of the ambient information, the map data and the internal state data indicate an increased margin for safe road vehicle travel provides for comfortable, calm and steady control when driving with ample space for safe maneuvering such as on a wide lane or on a straight road.

According to a fourth embodiment it is provided that the wheel angle controller is arranged to execute a wheel angle control loop and a wheel angle rate control loop and that the lateral controller is arranged to calculate a gain parameter for the wheel angle control loop and a gain parameter for the wheel angle rate control loop of the wheel angle controller.

The provision of using a gain parameter for the wheel angle control loop and a gain parameter for the wheel angle rate control loop, as above, enables recreation of a wheel angle rate request inside the power steering control module and improved tracking of the desired path.

According to a fifth embodiment it is provided that the wheel angle controller is arranged to execute an outer wheel angle control loop and an inner wheel angle rate control loop and that the lateral controller is arranged to calculate a gain parameter for the outer wheel angle control loop and a gain parameter for the inner wheel angle rate control loop of the wheel angle controller.

The provision of using a gain parameter for the outer wheel angle control loop and a gain parameter for the inner wheel angle rate control loop, as above, enables recreation of a wheel angle rate request inside the power steering control module and further improved tracking of the desired path.

According to a sixth embodiment it is provided that the lateral controller has a linear quadratic problem formulation with a quadratic penalty on wheel angle rate and wheel angle acceleration and the linear quadratic problem formulation is used to calculate the gain parameters.

The provision of using the linear quadratic problem formulation, as above, to calculate the gain parameters provides an efficient way to provide gain parameters enabling recreation in the power steering control module of a wheel angle rate request in an active safety domain master of the advanced driver assistance system.

According to a seventh embodiment it is provided that the power steering control module is arranged to recreate a wheel angle rate request for the wheel angle rate control loop of the wheel angle controller from the gain parameter for the wheel angle control loop and the gain parameter for the wheel angle rate control loop, the wheel angle request, the wheel angle and the wheel angle rate data.

The provision of recreating a wheel angle rate request, as above, provides a simple and reliable way of ensuring improved control by the wheel angle controller.

According to an eighth embodiment it is provided that the power steering control module is arranged to recreate the wheel angle rate request for the wheel angle rate control loop of the wheel angle controller as the gain parameter for the wheel angle control loop multiplied with the difference between the wheel angle request and the wheel angle reduced with the product of the gain parameter for the wheel angle rate control loop and the wheel angle rate data.

The provision of recreating a wheel angle rate request, as above, provides a simple and reliable way of ensuring further improved control by the wheel angle controller.

According to a ninth embodiment is provided a steer torque manager that comprises a wheel angle controller arranged to receive and use gain parameters, as above, in control loops of the wheel angle controller.

The provision of a steer torque manager, as above, provides for using high bandwidth in a wheel angle controller in order for a desired path to be tracked with increased control speed and accuracy when a traffic situation so requires, such as when free-space for safe maneuvers is limited, and reduced bandwidth in traffic situations allowing less precise control, such as when driving on a wide lane or on a straight road with ample space for safe maneuvering.

According to a tenth embodiment is provided a road vehicle that comprises an apparatus as above.

The provision of a road vehicle that comprises an apparatus as above provides for using high bandwidth in a wheel angle controller in order for a desired path to be tracked with increased control speed and accuracy when a traffic situation so requires, such as when free-space for safe maneuvers is limited, and reduced bandwidth in traffic situations allowing less precise control, such as when driving on a wide lane or on a straight road with ample space for safe maneuvering.

According to an eleventh embodiment is provided a method for situation dependent wheel angle control by a highly autonomous drive system or an advanced driver assistance system of a road vehicle, the highly autonomous drive system or advanced driver assistance system being arranged to receive internal state data from one or more road vehicle internal state measurement units and at least one of ambient information on the road vehicle surroundings from one or more road vehicle surrounding monitoring cameras and map data relating to the road vehicle surroundings from a road vehicle localization system, the road vehicle comprising: a lateral controller arranged to receive from the highly autonomous drive system or advanced driver assistance system information on a desired path, and to output a wheel angle request; a power steering control module comprising a wheel angle controller arranged to receive as inputs the wheel angle request from the lateral controller as well as wheel angle and wheel angle rate data, and to output an overlay torque request suitable for a motor controller of a steering system of the road vehicle, which method comprises: generating, by the highly autonomous drive system or advanced driver assistance system a penalty measure indicative of how penalties should be handled in the lateral controller based on the internal state data and at least one of the ambient information and the map data, and calculating in the lateral controller gain parameters, based on the penalty measure, and outputting to the wheel angle controller the calculated gain parameters; receiving to the wheel angle controller the gain parameters and using them in control loops of the wheel angle controller, to increase the bandwidth of the wheel angle controller if one or more of the ambient information, the map data and the internal state data indicate a need for increased control speed and accuracy for safely tracking the desired path, and to reduce the bandwidth of the wheel angle controller if one or more of the ambient information, the map data and the internal state data indicate that decreased control speed and accuracy can be allowed whilst still safely tracking the desired path.

A method as above provides for using high bandwidth in a wheel angle controller in order for a desired path to be tracked with increased control speed and accuracy when a traffic situation so requires, such as when free-space for safe maneuvers is limited, and reduced bandwidth in traffic situations allowing less precise control, such as when driving on a wide lane or on a straight road with ample space for safe maneuvering.

BRIEF DESCRIPTION OF THE DRAWINGS

In the following, embodiments herein will be described in greater detail by way of example only with reference to attached drawings.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

This disclosure is based on the realization that it should be possible to provide an improved apparatus for tracking a path requested by a highly autonomous drive system (HAD) or an advanced driver assistance system (ADAS) of a road vehicle such that the accuracy and responsiveness can be improved if a traffic situation so requires, e.g., if there is less space for performing safe maneuvering when tracking the desired path. This, whilst at the same time being able to provide for smooth and comfortable control for tracking the desired path in situations where there is more space for performing safe maneuvering. As described in the following it is thus suggested to alter closed loop wheel angle dynamics as a road vehicle enters new traffic situations and environments. Such a path is usually requested through the highly autonomous drive system or an advanced driver assistance system continuously issuing wheel/pinion angle requests.

Figure 1:
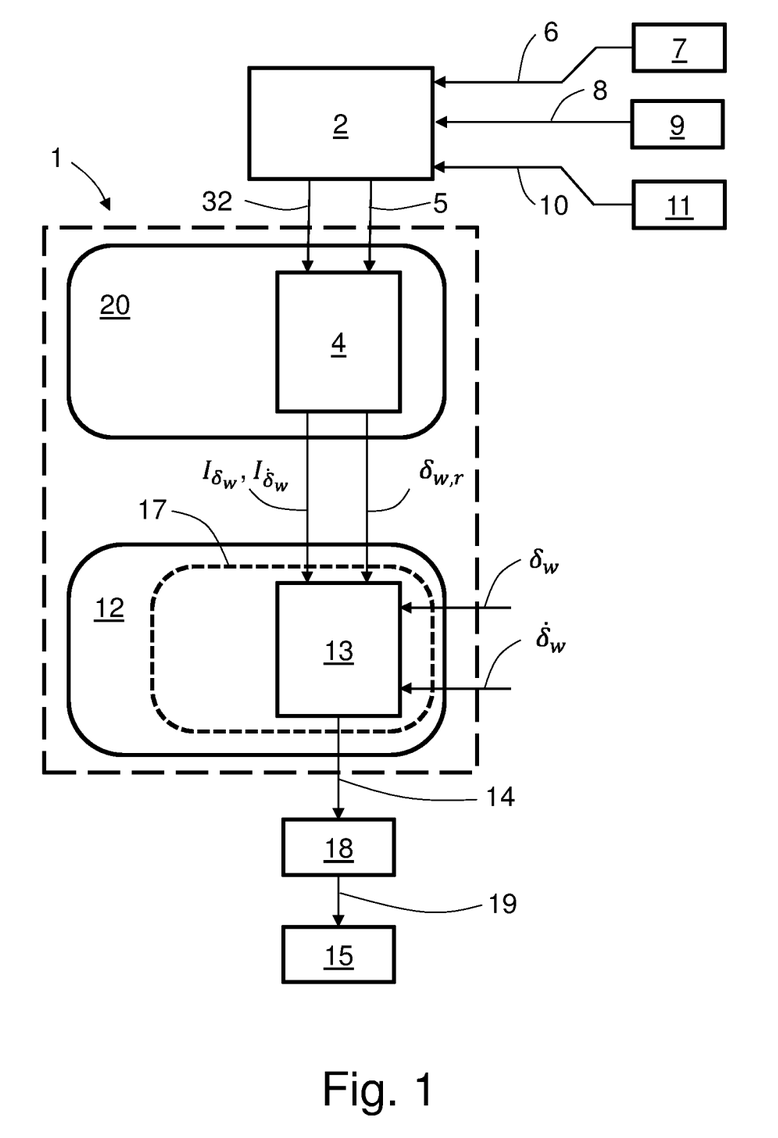
FIG. 1 is a schematic illustration of an apparatus for situation dependent wheel angle control by an advanced driver assistance system of a road vehicle.

This is, as illustrated in FIG. 1, provided through an apparatus 1 for situation dependent wheel angle $\delta_w$ control by a highly autonomous drive system 2 or an advanced driver assistance system 2 of a road vehicle 3, as described in the following. The apparatus 1 is suitable for use with a highly autonomous drive system 2 or an advanced driver assistance system 2 of a road vehicle 3 having an electrical power assisted steering (EPAS) 40. The highly autonomous drive system 2 or advanced driver assistance system 2 of the road vehicle 3 having situation awareness through being arranged to receive internal state data 10 from one or more road vehicle 3 internal state measurement units 11 and at least one of ambient information 6 on the road vehicle 3 surroundings from one or more road vehicle 3 surrounding monitoring cameras 7 and map data 8 relating to the road vehicle 3 surroundings from a road vehicle 3 localization system 9, such as e.g., a GPS based navigational system.

FIG. 1 illustrates the apparatus 1 schematically. A lateral controller 4, arranged in a domain 20 outside of a power steering control module (PSCM) 12, is arranged to receive, from the highly autonomous drive system 2 or advanced driver assistance system 2, information on a desired path 5. The lateral controller 4 is further arranged to output a wheel angle request $\delta_{w,r}$ (index r for request).

The power steering control module 12 comprises a wheel angle controller 13. The wheel angle controller 13 is arranged to receive as inputs the wheel angle request $\delta_{w,r}$ from the lateral controller 4 as well as wheel angle $\delta_w$ and wheel angle rate $\dot{\delta}_w$ data from one or more sensors (not shown) of the road vehicle 3 steering system.

The wheel angle controller 13 is further arranged to output an overlay torque request 14 suitable for a motor controller 15 of a steering system 16 of the road vehicle 3.

The overlay torque request 14 can be identified as a QM hazard which does not dictate any safety requirements, why it is subject to an overlay torque safety limiter 18 which provides a safety limited overlay torque request 19 that fulfil Automotive Safety Integrity Level D, which is the highest classification of initial hazard (injury risk) defined within ISO 26262 and to that standard's most stringent level of safety measures to apply for avoiding an unreasonable residual risk.

The highly autonomous drive system 2 or advanced driver assistance system 2 is arranged to generate a penalty measure 32 indicative of how penalties should be handled in the lateral controller 4 based on the internal state data 10 and at least one of the ambient information 6 and the map data 8.

The lateral controller 4 is further arranged to calculate gain parameters $I_{\delta_w}, I_{\dot{\delta}_w}$ based on the penalty measure 32, and to output to the wheel angle controller 13 the calculated gain parameters $I_{\delta_w}, I_{\dot{\delta}_w}$.

Thus, the calculated gain parameters $I_{\delta_w}, I_{\dot{\delta}_w}$ are continuously sent to the wheel angle controller 13 of the power steering control module 12, which makes it possible to alter closed loop wheel angle dynamics as the road vehicle 3 enters new traffic situations and environments, as will be elaborated in the following.

The wheel angle controller 13 is further arranged to receive and use the gain parameters $I_{\delta_w}, I_{\dot{\delta}_w}$ in control loops of the wheel angle controller 13. The gain parameters $I_{\delta_w}, I_{\dot{\delta}_w}$ are used in the control loops such that the bandwidth of the wheel angle controller 13 is increased if one or more of the ambient information 6, the map data 8 and the internal state data 10 indicate a need for increased control speed and accuracy for safely tracking the desired path 5, and reduced if one or more of the ambient information 6, the map data 8 and the internal state data 10 indicate that decreased control speed and accuracy can be allowed whilst still safely tracking the desired path 5.

The above provides for using high bandwidth in the wheel angle controller 13 in order for the desired path 5 to be tracked with increased accuracy and responsiveness when a traffic situation so requires, such as when free-space for safe maneuvers around the road vehicle 3 is limited, e.g., if the road vehicle 3 is passing a large truck, driving in a narrow lane or if a forward vehicle is cutting in ahead of the road vehicle 3. It further provides for using reduced bandwidth in traffic situations allowing to provide for slightly less precise and responsive and therefore more smooth and comfortable control for tracking the desired path 5 in situations where there is more space for performing safe maneuvering, such as when driving on a wide lane or on a straight road with ample space for safe maneuvering.

The ambient information 6 and map data 8 provides for situation awareness, which is normally not available in the power steering control module 12. Moreover, it is not possible to move wheel angle control loops of the wheel angle controller 13 outside the power steering control module 12 due to the communication delays that would result therefrom. The above solution is thus more or less insensitive to time delays between the lateral controller 4 and the power steering control module 12 since the lateral controller 4 will not require any information on the current state of the power steering control module 12.

In consequence, in some embodiments the lateral controller 4 is further arranged to calculate the gain parameters $I_{\delta_w}$, $I_{\dot{\delta}_w}$ to provide for increased control speed and accuracy in tracking of the desired path 5 if at least one of the ambient information 6, the map data 8 and the internal state data 10 indicate a reduced margin for safe road vehicle 3 travel along the desired path 5.

And conversely, in some embodiments the lateral controller 4 is further arranged to calculate the gain parameters $I_{\delta_w}$, $I_{\dot{\delta}_w}$ to provide for decreased control speed and accuracy in tracking of the desired path 5 if at least one of the ambient information 6, the map data 8 and the internal state data 10 indicate an increased margin for safe road vehicle 3 travel along the desired path 5.

The term margin for safe road vehicle 3 travel along the desired path 5 is here meant to encompass physical margins for unobstructed road vehicle 3 travel, such as distances to surrounding infrastructure and vehicles, allowable velocities and acceleration with respect to surrounding traffic, etc.

These embodiments provide for a desired path 5 to be tracked with increased accuracy and responsiveness when a traffic situation so requires, such as when free-space for safe maneuvers is limited as well as for comfortable, calm and steady control when driving with ample space for safe maneuvering, such as on a wide lane or on a straight road.

In further embodiments the wheel angle controller 13 is arranged to execute a wheel angle control loop and a wheel angle rate control loop and the lateral controller 4 is arranged to calculate a gain parameter $I_{\delta_w}$ for the wheel angle control loop and a gain parameter $I_{\dot{\delta}_w}$ for the wheel angle rate control loop of the wheel angle controller 13.

This enables recreation of a wheel angle rate request $\dot{\delta}_{w,r}$ inside the power steering control module 12, as will be described in more detail in the following, and further provides for improved tracking of the desired path 5.

In order to provide for further improved tracking of the desired path 5, in a further embodiment the wheel angle controller 13 is arranged to execute an outer wheel angle control loop and an inner wheel angle rate control loop and that the lateral controller 4 is arranged to calculate a gain parameter $I_{\delta_{w,o}}$ for the outer wheel angle control loop (index o for outer) and a gain parameter $I_{\dot{\delta}_{w,i}}$ for the inner wheel angle rate control loop (index i for inner) of the wheel angle controller 13.

For embodiments herein, it is envisaged that the lateral controller 4 has a linear quadratic problem formulation with a quadratic penalty on wheel angle rate $\dot{\delta}_w$ and wheel angle acceleration $\ddot{\delta}_w$ and the linear quadratic problem formulation is used to calculate the gain parameters $I_{\delta_w}$, $I_{\delta_{w,o}}$, $I_{\dot{\delta}_w}$, $I_{\dot{\delta}_{w,i}}$. This as it in the linear quadratic problem formulation is natural to consider the wheel angle rate $\dot{\delta}_w$ as the control signal, which means that the linear quadratic problem will decide the gains used in the wheel angle $\delta_w$ control loop. Thus, this provides an efficient way to provide gain parameters $I_{\delta_w}$, $I_{\delta_{w,o}}$, $I_{\dot{\delta}_w}$, $I_{\dot{\delta}_{w,i}}$ enabling recreation in the power steering control module 12 of a wheel angle rate request $\dot{\delta}_{w,r}$ in an active safety domain master of the highly autonomous drive system 2 or advanced driver assistance system 2.

As mentioned above, in some further embodiments the power steering control module 12 is arranged to recreate a wheel angle rate request $\dot{\delta}_{w,r}$ for the wheel angle rate control loop of the wheel angle controller 13 from the gain parameter $I_{\delta_w}$, $I_{\delta_{w,o}}$ for the wheel angle control loop and the gain parameter $I_{\dot{\delta}_w}$, $I_{\dot{\delta}_{w,i}}$ for the wheel angle rate control loop, the wheel angle request $\delta_{w,r}$, the wheel angle $\delta_w$ and the wheel angle rate data $\dot{\delta}_w$. This provides a simple and reliable way of ensuring improved control by the wheel angle controller 13.

More particularly, in some embodiments this is achieved through the power steering control module 12 being arranged to recreate the wheel angle rate request $\dot{\delta}_{w,r}$ for the wheel angle rate control loop of the wheel angle controller 13 as the gain parameter for the wheel angle control loop $I_{\delta_w}$, $I_{\delta_{w,o}}$ multiplied with the difference between the wheel angle request $\delta_{w,r}$ and the wheel angle $\delta_w$ reduced with the product of the gain parameter for the wheel angle rate control loop $I_{\dot{\delta}_w}$, $I_{\dot{\delta}_{w,i}}$ and the wheel angle rate data $\dot{\delta}_w$.

I.e., as $\dot{\delta}_{w,r} = I_{\delta_w}(\delta_{w,r} - \delta_w) - I_{\dot{\delta}_w}\dot{\delta}_w$ It is further envisaged herein a steer torque manager 17, that comprises a wheel angle controller 13 arranged to receive and use the gain parameters $I_{\delta_w}$, $I_{\dot{\delta}_w}$ in control loops of the wheel angle controller 13, as described above. A steer torque manager, commonly abbreviated as STM, is a component that is commonly located in an EPAS supplier node, herein referred to as Power Steering Control Module, commonly abbreviated as PSCM.

Figure 3:
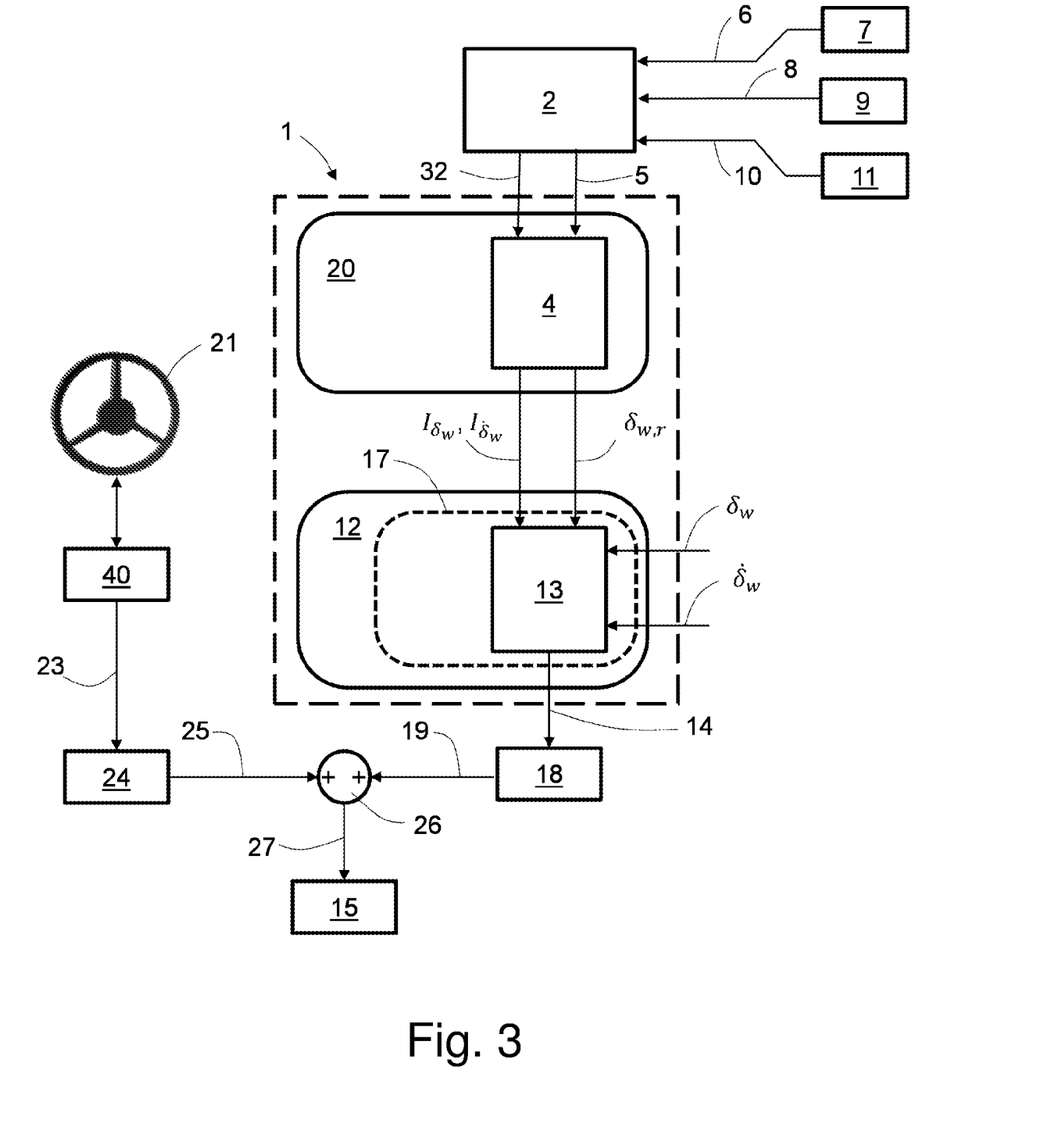
FIG. 3 is a schematic illustration of a road vehicle steering system comprising the apparatus of FIG. 1 arranged with an electrical power assisted steering system thereof.

FIG. 3 is a schematic illustration of a road vehicle steering system comprising the apparatus of FIG. 1 arranged with an electrical power assisted steering system 40 thereof.

As illustrated schematically in FIG. 3, the apparatus of FIG. 1 may be arranged with an electrical power assisted steering system 40 of a road vehicle 3. In such an arrangement the steer torque manager 17, may further be arranged such that a steering wheel 21 torque applied by a driver of the road vehicle 3, is sensed by a steering wheel torque sensor 22 and used by an electrical power assisted steering (EPAS) assistance functionality 40 to provide an assistance torque request 23, for assisting a driver when during manual or semi-automated steering control of the road vehicle 3. Such an assistance torque request 23 is normally also identified as a QM hazard which does not dictate any safety requirements according to the Automotive Safety Integrity Level (ASIL) risk classification scheme defined by the ISO 26262—Functional Safety for Road Vehicles standard, and is therefore normally also subject to an assistance torque safety limiter 24 which in turn provide a safety limited assistance torque request 25 which is then suitably brought to a summation point 26 to be added to the safety limited overlay torque request 19, and which summation point in turn provides a total torque request 27 to the motor controller 15 of the steering system of the road vehicle 3.

Figure 2:
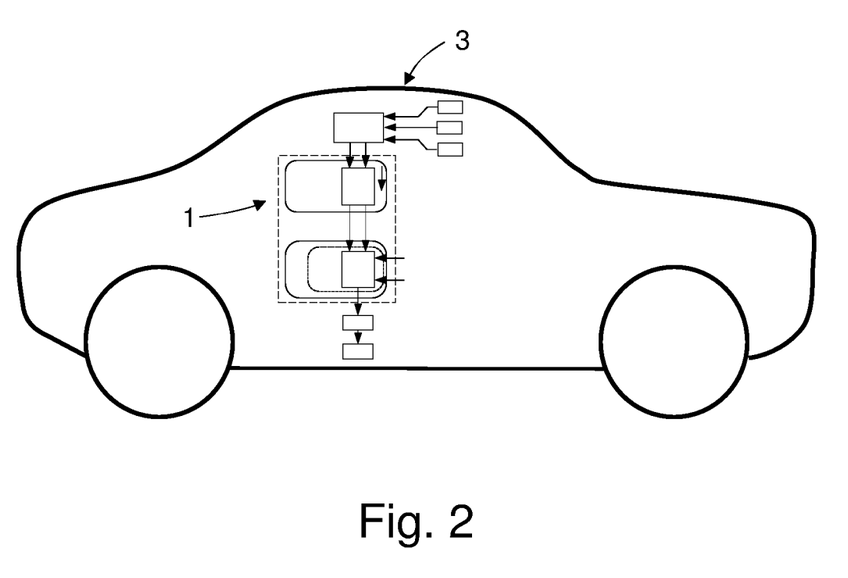
FIG. 2 is a schematic illustration of a road vehicle comprising an apparatus for situation dependent wheel angle control according to FIG. 1.

Still further envisaged herein is a road vehicle 3, as illustrated in FIG. 2, which has an apparatus 1 for situation dependent wheel angle $\delta_w$ control by a highly autonomous drive system 2 or an advanced driver assistance system 2, as described above with reference to FIG. 1.

A road vehicle 2 that has a highly autonomous drive system 2 or an advanced driver assistance system 2 that comprises an apparatus 1, as described above, provides for improved safety and driver comfort when using a highly autonomous drive system 2 or an advanced driver assistance system 2, such as a pilot assist system.

Figure 4:
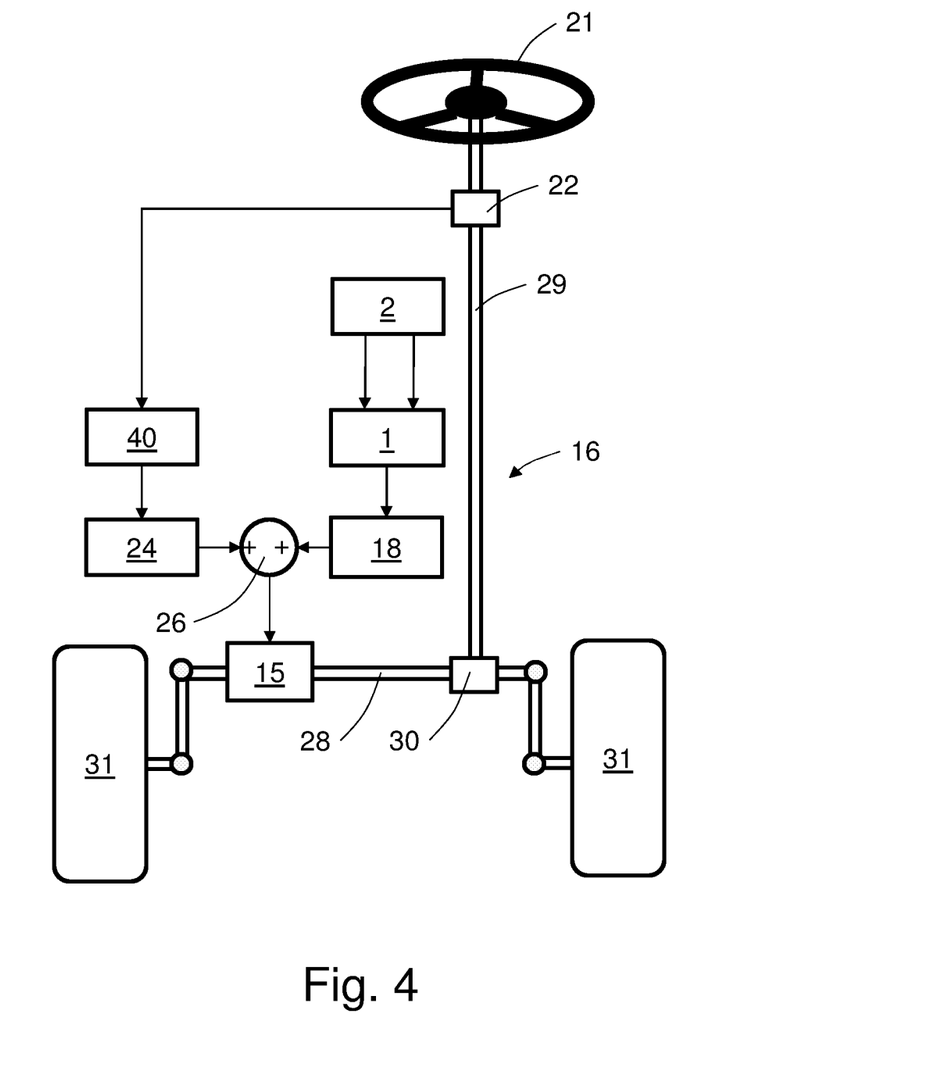
FIG. 4 is a schematic illustration of the apparatus 1 of FIG. 1, arranged with an electrical power assisted steering system as illustrated in FIG. 3.

As illustrated schematically in FIG. 4, the apparatus 1 of FIG. 1, e.g., arranged with an electrical power assisted steering system 40 as illustrated in FIG. 3, may be arranged in a steering system 16 of the road vehicle 3 that comprises a steering wheel 21, connected to a steering rack 28 via a torsion bar 29, to which a steering wheel torque sensor 22 is arranged, and a pinion gear 30. The power steering control module 27 comprises the apparatus 1, which is arranged to control the overlay torque motor 15 of the steering system 16 of the road vehicle 3 to provide an overlay torque to steerable wheels 31 of the vehicle 3 steering system 16.

In accordance with the present application is also envisaged a method for situation dependent wheel angle $\delta_w$ control by a highly autonomous drive system 2 or an advanced driver assistance system 2 of a road vehicle 3, the highly autonomous drive system 2 or advanced driver assistance system 2 being arranged to receive internal state data 10 from one or more road vehicle 3 internal state measurement units 11 and at least one of ambient information 6 on the road vehicle 3 surroundings from one or more road vehicle 3 surrounding monitoring cameras 7 and map data 8 relating to the road vehicle 3 surroundings from a road vehicle 3 localization system 9.

The method is adapted for a road vehicle 3 comprising a lateral controller 4 arranged to receive from the highly autonomous drive system 2 or advanced driver assistance system 2 information on a desired path 5, and to output a wheel angle request $\delta_{w,r}$.

The method is further adapted for a road vehicle 3 having power steering control module 12 that comprises a wheel angle controller 13, where the wheel angle controller 13 is arranged to receive as inputs the wheel angle request $\delta_{w,r}$ from the lateral controller 4 as well as wheel angle $\delta_w$ and wheel angle rate $\dot{\delta}_w$ data, and where the wheel angle controller 13 further is arranged to output an overlay torque request 14 suitable for a motor controller 15 of a steering system 16 of the road vehicle 3.

Figure 5:
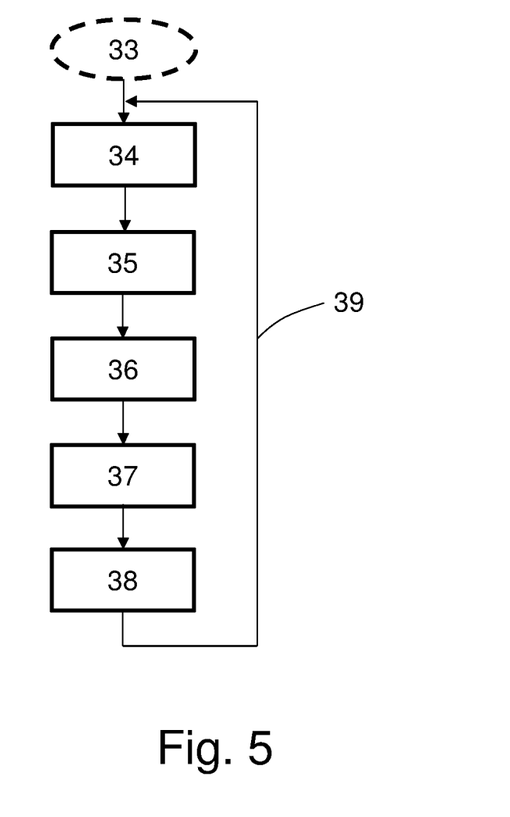
FIG. 5 is a schematic illustration of a method for situation dependent wheel angle control by an advanced driver assistance system of a road vehicle according to embodiments herein.

As schematically illustrated in FIG. 5 the method starts out at 33, next at 34 is generated by the highly autonomous drive system 2 or advanced driver assistance system 2 a penalty measure 32 indicative of how penalties should be handled in the lateral controller 4 based on the internal state data 10 and at least one of the ambient information 6 and the map data 8. At 35 is calculated in the lateral controller 4 gain parameters $I_{\delta_w}$, $I_{\dot{\delta}_w}$ based on the penalty measure (32). The calculated gain parameters $I_{\delta_w}$, $I_{\dot{\delta}_w}$ are output to the wheel angle controller 13 at 36. The wheel angle controller 13 receives the calculated gain parameters $I_{\delta_w}$, $I_{\dot{\delta}_w}$ at 37, and uses them at 38 in control loops of the wheel angle controller 13, to increase the bandwidth of the wheel angle controller 13 if one or more of the ambient information 6, the map data 8 and the internal state data 10 indicate a need for increased control speed and accuracy for safely tracking the desired path 5, and to reduce the bandwidth of the wheel angle controller 13 if one or more of the ambient information 6, the map data 8 and the internal state data 10 indicate that decreased control speed and accuracy can be allowed whilst still safely tracking the desired path 5, whereupon the method at 39 loops back to start.

A method as above provides for using high bandwidth in a wheel angle controller 13 in order for a desired path 5 to be tracked with increased control speed and accuracy when a traffic situation so requires, such as when free-space for safe maneuvers is limited, and reduced bandwidth in traffic situations allowing smooth and comfortable control for tracking the desired path 5 in traffic situations where there is more space for performing safe maneuvering.

The above-described embodiments may be varied within the scope of the following claims.

It should be noted that the apparatus 1, the highly autonomous drive system 2, the advanced driver assistance system 2, the electrical power assisted steering system assistance functionality 40, the internal state measurement units 11, the monitoring cameras 7, the vehicle localization system 9, the lateral controller 4, the domain 20, the power steering control module 12, the wheel angle controller 13, the motor controller 15, the steering system 16, the steer torque manager 17, the overlay torque safety limiter 18, the steering wheel torque sensor 22, assistance torque safety limiter 24, the motor controller 15, the power steering control module 27, as well as any other device, unit, feature, manager, system, functionality, action, limiter, sensor, motor, controller, filter, module, arrangement, or the like described herein may comprise and/or be implemented in or by one or more appropriately programmed processors (e.g., one or more microprocessors including central processing units (CPU)) and associated memory and/or storage, which may include data, operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. An apparatus for situation dependent wheel angle ($\delta_w$) control by a highly autonomous drive system or an advanced driver assistance system of a road vehicle, the highly autonomous drive system or advanced driver assistance system configured to receive internal state data from one or more road vehicle internal state measurement units and at least one of ambient information on road vehicle surroundings from one or more road vehicle surrounding monitoring cameras and map data relating to the road vehicle surroundings from a road vehicle localization system, the apparatus comprising:

a lateral controller configured to receive from the highly autonomous drive system or advanced driver assistance system information on a desired path, and to output a wheel angle request ($\delta_{w,r}$); and a power steering control module comprising a wheel angle controller configured to receive as inputs the wheel angle request ($\delta_{w,r}$) from the lateral controller as well as wheel angle ($\delta_w$) and wheel angle rate ($\dot\delta_w$) data, and to output an overlay torque request suitable for a motor controller of a steering system of the road vehicle;

wherein the lateral controller is configured to calculate gain parameters ($I_{\delta_w}$, $I_{\dot\delta_w}$) based on a penalty measure generated by the highly autonomous drive system or advanced driver assistance system, the penalty measure indicative of how penalties should be handled in the lateral controller based on the internal state data and at least one of the ambient information and the map data, and to output to the wheel angle controller the calculated gain parameters ($I_{\delta_w}$, $I_{\dot\delta_w}$);

wherein the wheel angle controller is further configured to receive and use the gain parameters ($I_{\delta_w}$, $I_{\dot\delta_w}$) in control loops of the wheel angle controller such that a bandwidth of the wheel angle controller is increased if one or more of the ambient information, the map data, and the internal state data indicate a need for increased control speed and accuracy for safely tracking the desired path, and reduced if one or more of the ambient information, the map data, and the internal state data indicate that decreased control speed and accuracy can be allowed while still safely tracking the desired path.

2. The apparatus of claim 1 wherein the lateral controller is further configured to calculate the gain parameters ($I_{\delta_w}$, $I_{\dot\delta_w}$) to provide for increased control speed and accuracy in tracking of the desired path if at least one of the ambient information, the map data, and the internal state data indicate a reduced margin for safe road vehicle travel along the desired path.

3. The apparatus of claim 1 wherein the lateral controller is further configured to calculate the gain parameters ($I_{\delta_w}$, $I_{\dot\delta_w}$) to provide for decreased control speed and accuracy in tracking of the desired path if at least one of the ambient information, the map data, and the internal state data indicate an increased margin for safe road vehicle travel along the desired path.

4. The apparatus of claim 1 wherein the wheel angle controller is configured to execute a wheel angle control loop and a wheel angle rate control loop and the lateral controller is configured to calculate a gain parameter ($I_{\delta_w}$) for the wheel angle control loop and a gain parameter ($I_{\dot\delta_w}$) for the wheel angle rate control loop of the wheel angle controller.

5. The apparatus of claim 1 wherein the wheel angle controller is configured to execute an outer wheel angle control loop and an inner wheel angle rate control loop and the lateral controller is configured to calculate a gain parameter ($I_{\delta_{w,o}}$) for the outer wheel angle control loop and a gain parameter ($I_{\dot\delta_{w,i}}$) for the inner wheel angle rate control loop of the wheel angle controller.

6. The apparatus of claim 1 wherein the lateral controller has a linear quadratic problem formulation with a quadratic penalty on wheel angle rate ($\dot\delta_w$) and wheel angle acceleration ($\ddot\delta_w$) and the linear quadratic problem formulation is used to calculate the gain parameters ($I_{\delta_w}$, $I_{\delta_{w,o}}$, $I_{\dot\delta_w}$, $I_{\dot\delta_{w,i}}$).

7. The apparatus of claim 1 wherein the power steering control module is configured to recreate a wheel angle rate request ($\dot\delta_{w,r}$) for the wheel angle rate control loop of the wheel angle controller from the gain parameter for the wheel angle control loop ($I_{\delta_w}$, $I_{\delta_{w,o}}$) and the gain parameter for the wheel angle rate control loop ($I_{\dot\delta_w}$, $I_{\dot\delta_{w,i}}$), the wheel angle request ($\delta_{w,r}$), the wheel angle ($\delta_w$) and the wheel angle rate data ($\dot\delta_w$).

8. The apparatus of claim 7 wherein the power steering control module is configured to recreate the wheel angle rate request ($\dot\delta_{w,r}$) for the wheel angle rate control loop of the wheel angle controller as the gain parameter for the wheel angle control loop ($I_{\delta_w}$, $I_{\delta_{w,o}}$) multiplied with the difference between the wheel angle request ($\delta_{w,r}$) and the wheel angle ($\delta_w$) reduced with the product of the gain parameter for the wheel angle rate control loop ($I_{\dot\delta_w}$, $I_{\dot\delta_{w,i}}$) and the wheel angle rate data ($\dot\delta_w$).

9. A steer torque manager comprising the apparatus of claim 1 wherein the wheel angle controller is configured to receive and use gain parameters ($I_{\delta_w}$, $I_{\dot\delta_w}$) in control loops of the wheel angle controller.

10. A road vehicle comprising the apparatus of claim 1.

11. A method for situation dependent wheel angle ($\delta_w$) control by a highly autonomous drive system or an advanced driver assistance system of a road vehicle, the highly autonomous drive system or advanced driver assistance system configured to receive internal state data from one or more road vehicle internal state measurement units and at least one of ambient information on road vehicle surroundings from one or more road vehicle surrounding monitoring cameras and map data relating to the road vehicle surroundings from a road vehicle localization system, the road vehicle having a lateral controller configured to receive from the highly autonomous drive system or advanced driver assistance system information on a desired path and output a wheel angle request ($\delta_{w,r}$), a power steering control module having a wheel angle controller configured to receive as inputs the wheel angle request ($\delta_{w,r}$) from the lateral controller as well as wheel angle ($\delta_w$) and wheel angle rate ($\dot\delta_w$) data, and to output an overlay torque request suitable for a motor controller of a steering system of the road vehicle, the method comprising:

generating, by the highly autonomous drive system or advanced driver assistance system, a penalty measure indicative of how penalties should be handled in the lateral controller based on the internal state data and at least one of the ambient information and the map data;

calculating, by the lateral controller, gain parameters ($I_{\delta_w}$, $I_{\dot\delta_w}$) based on the penalty measure;

outputting to the wheel angle controller the calculated gain parameters ($I_{\delta_w}$, $I_{\dot\delta_w}$); and receiving, at the wheel angle controller, the gain parameters ($I_{\delta_w}$, $I_{\dot\delta_w}$) and using them in control loops of the wheel angle controller to increase a bandwidth of the wheel angle controller if one or more of the ambient information, the map data, and the internal state data indicate a need for increased control speed and accuracy for safely tracking the desired path, and to reduce the bandwidth of the wheel angle controller if one or more of the ambient information, the map data, and the internal state data indicate that decreased control speed and accuracy can be allowed while still safely tracking the desired path.

12. A method for situation dependent wheel angle ($\delta_w$) control by a highly autonomous drive system or an advanced driver assistance system of a road vehicle, the highly autonomous drive system or advanced driver assistance system configured to receive internal state data from one or more road vehicle internal state measurement units and at least one of ambient information on road vehicle surroundings from one or more road vehicle surrounding monitoring cameras and map data relating to the road vehicle surroundings from a road vehicle localization system, the road vehicle having a lateral controller configured to receive from the highly autonomous drive system or advanced driver assistance system information on a desired path and output a wheel angle request ($\delta_{w,r}$), a power steering control module having a wheel angle controller configured to receive as inputs the wheel angle request ($\delta_{w,r}$) from the lateral controller as well as wheel angle ($\delta_w$) and wheel angle rate ($\dot{\delta}_w$) data, and to output an overlay torque request suitable for a motor controller of a steering system of the road vehicle, wherein the highly autonomous drive system or advanced driver assistance system generates a penalty measure indicative of how penalties should be handled in the lateral controller based on the internal state data and at least one of the ambient information and the map data, and the lateral controller generates gain parameters ($I_{\delta_w}$, $I_{\dot{\delta}_w}$) based on the penalty measure and outputs the calculated gain parameters ($I_{\delta_w}$, $I_{\dot{\delta}_w}$) to the wheel angle controller, the method comprising:

receiving, at the wheel angle controller, the calculated gain parameters ($I_{\delta_w}$, $I_{\dot{\delta}_w}$);

increasing, in control loops of the wheel angle controller, a bandwidth of the wheel angle controller using the gain parameters ($I_{\delta_w}$, $I_{\dot{\delta}_w}$) if one or more of the ambient information, the map data, and the internal state data indicate a need for increased control speed and accuracy for safely tracking the desired path; and reducing, in control loops of the wheel angle controller, the bandwidth of the wheel angle controller using the gain parameters ($I_{\delta_w}$, $I_{\dot{\delta}_w}$) if one or more of the ambient information, the map data, and the internal state data indicate that decreased control speed and accuracy can be allowed while still safely tracking the desired path.

* * * * *